United States Patent [19]

Beachem et al.

[11] 3,960,755

[45] June 1, 1976

[54] DETECTING COMPOSITIONS AND METHOD OF USING SAME

[75] Inventors: Michael Thomas Beachem, Somerset; Mary Ellen Nichols, Highland Park, both of N.J.

[73] Assignee: American Cyanamid Company, Stamford, Conn.

[22] Filed: May 8, 1967

[21] Appl. No.: 638,697

[52] U.S. Cl. .............................. 252/301.16; 106/21
[51] Int. Cl.² .......................................... C09K 11/00
[58] Field of Search ......... 106/21; 252/301.2, 301.3

[56] References Cited
UNITED STATES PATENTS

| | | | |
|---|---|---|---|
| 2,938,292 | 5/1960 | Jaskowsky et al. | 106/21 |
| 2,953,530 | 9/1960 | Switzer | 252/301.2 |
| 3,057,806 | 10/1962 | Switzer | 252/301.2 |
| 3,066,105 | 11/1962 | McCafferty | 252/301.2 |
| 3,162,642 | 12/1964 | McCafferty | 252/301.2 |
| 3,201,352 | 8/1965 | Jayme et al. | 252/301.2 |
| 3,216,948 | 11/1965 | Redding | 252/301.2 |
| 3,230,178 | 1/1966 | Bennahmias | 252/301.2 |
| 3,327,018 | 6/1967 | D'Alelio | 252/301.2 |

OTHER PUBLICATIONS

American Ink Maker, Nov. 1945, pp. 27–30.

*Primary Examiner*—Harvey E. Behrend
*Attorney, Agent, or Firm*—Frank M. Van Riet

[57] ABSTRACT

This invention relates to compositions of matter useful for marking and identification purposes composed of a non-fluorescent solvent, a fluorescent material and a water-insoluble, tacky, amorphous, resinous material and a method of marking and identifying objects therewith.

4 Claims, No Drawings

DETECTING COMPOSITIONS AND METHOD OF USING SAME

BACKGROUND OF THE INVENTION

One of the basic problems which has plagued military personnel over the years has to do with the identification of objects. This problem relates not only to personnel but also to equipment such as trucks, boats, etc. That is to say, in recent years it has become more and more difficult to identify insurgents by their clothing, appearance, etc. and therefore a system of identification whereby it is possible to determine whether a subject in question has come through a specific military zone has become necessary. Many identification systems have been tried, however, they fail because of various deficiencies, e.g. they are easily removed either by the elements, i.e., rain, etc. or by transfer to other objects via contact therewith and the like. Additionally, many known systems require extensive and cumbersome equipment in order that they may be detected. Such equipment is obviously impossible to transport and utilize, especially in the field of combat.

SUMMARY

We have now discovered a class of compositions which may be applied to various objects via a multiplicity of methods for purposes of identification and detection of insurgents. Our compositions are featured by their excellent absorption on the surface of the object to which they are applied, their excellent adhesion and their excellent distribution over the treated area. They have exceptional properties for use in water, i.e. rivers, lakes, etc. and may be applied both by aerial spraying and by slow release beneath the surface thereof. They are especially adapted for use on wood in that they penetrate into the pores of the wood and thereby remain detectable for long periods of time.

Prior art systems such as non-wettable powders and oils, as mentioned above, fail to meet accepted military requirements, as do conventional dyes such as those used to trace the flow of rivers or mark the location of survivors of maritime disasters. The non-wettable powders adhere poorly to the surface of the objects and therefore are easily removed, while the oils tend to penetrate too deeply into porous objects and therefore become undetectable. The dyes are too easily visible by the human eye and thererfore objects marked therewith can be easily avoided.

The military requirements for marking compositions are:

A. They should be substantially invisible to the naked eye;

B. The mark formed thereby should have a definite and controllable lifetime, i.e. about 12 hours to 6 weeks;

C. They should be non-toxic to humans, animals and fish;

D. They should be capable of being easily dispensed mechanically above or below the surface of water and E. They should be very adherent to the object with which they are in contact.

Our marking compositions fulfill all of these requirements.

DESCRIPTION OF THE INVENTION INCLUDING PREFERRED EMBODIMENTS

As mentioned above, our novel compositions are composed of a non-fluorescent solvent, a fluorescent material and a water-insoluble, tacky, substantially colorless, amorphous, resinous material. The fluorescent material remains the same in all our compositions regardless of the ultimate use thereof, however, said ultimate use of the system does govern the properties of the solvent with which the other ingredients are mixed. For example, when the marking composition is to be used to monitor river traffic by marking boats moving through flowing water in order to determine whether or not a given boat has traversed a restricted area, the solvent must be substantially water-insoluble, and have a density less than about 1.0 so that the composition will float on the surface of the water. Therefore, the composition can be contained in a suitable submerged device which periodically or continually releases aliquots of the composition which float to the surface and distribute over a large area thereof. Obviously, the solvent itself, should not be fluorescent because it would interfere with the ultimate detection of the composition per se.

The resinous material used in such a boat-marking composition should also have a density of less than about 1.0 for the same reasons. It should also be colorless when in the form of a film on water, i.e. it should show substantially no light diffraction when spread as a film on water, and should, furthermore, be odorless, as should the other ingredients of the compositions. The resinous material should also be, in addition to being tacky, amorphous, water-insoluble, as mentioned above, and at least slightly wood permeable.

When the composition is utilized as an aerial spray whereby it is sprayed over areas to be monitored or directly onto a suspected object without detection, the only requirement is that the solvent should have an initial boiling point of at least about 212°F. All other properties of the resin and solvent remain the same regardless of the end use.

Examples of suitable solvents useful in the water application mentioned above include the aromatic hydrocarbons such as xylene, toluene, benzene, etc. normally liquid aliphatic hydrocarbons such as pentane, hexane, heptane, etc. ethyl acetate, ethyl chloride, butyl formate, dibutyl ether, methylethyl sulfide, methylbenzyl ether and the like, i.e. any solvent which possesses the properties mentioned above.

Examples of solvents applicable in the above-described compositions useful in aerial applications include water, xylene, toluene, substantially aromatic petroleum fractions, e.g. cycle oil, fuel oil, etc., such as the Panasols which are a series of high-solvency aromatic hydrocarbons derived from petroleum and commercially available from the Amoco Chemicals Corporation and the like. The amount of solvent used in our compositions is not critical except that enough should be used so as to dissolve the other components and result in compositions having viscosities in the range set forth hereinbelow.

The fluorescent material used in our compositions can consist of any material or combination of materials which can be activated by ultraviolet light and which emit in the visible (are colored in the visible region). The fluorescent material can be utilized in amounts ranging from about 0.1% to about 5.0%, by weight, based on the total weight of the final composition. The fluorescent material is preferably soluble in the solvent and the resinous material but may also be utilized as a suspension therein. Examples include the benzothiazoles, (U.S. Pat. Nos. 3,049,509; 2,985,661) e.g. 2-(2-hydroxy-5-chlorophenyl)-benzothiazole; 2-(2-hydroxy-3-methoxyphenyl) benzothiazole; 2-phenyl-5-methyl-6-methoxy benzothiazole; 2-(2-aminophenyl)-benzothiazole; 2,2'-bis-benzothiazole; 2-benzimido-6-methoxy-3-methylbenzothiazole; 2-(p-acetamidophenyl)-6-methylbenzothiazole, etc.: the quinazolones (U.S. Pat. No. 3,169,129; 3,269,955; Ser. No. 547,428, filed May 4, 1966) e.g. 2-(2-hydroxy-3,5-dichlorophenyl)-4(3)-quinazolone; 2-(4-methoxyphenyl)-4(3)-quinazolone; 6-methoxy-2-phenyl-4(3)-quinazolone; 6-butyl-2-(4-methoxyphenyl)-4(3)-quinazolone; 2-(3-hydroxy-2-naphthyl)-quinazolone; 1,2-dihydro-2-(o-methoxyphenyl) quinazolone; 2-(2-hydroxyphenyl)-quinazolone ethyl carbonate; 2-styril quinazolone; 2-(2-hydroxy-3-nitrophenyl)-4(3)-quinazolone; 2-[2-hydroxy-5-(azophenyl)phenyl]-4(3)-quinazolone, etc.; 4-methyl-7-dimethylamino coumarin (U.S. Pat. No. 2,844,539); the oxazoles, e.g. 2-(1-naphthyl)-5-phenyl oxazole (U.S. Pat. No. 2,985,661); the benzimidazoles, (U.S. Pat. No. 2,985,661) e.g. 2-(2-hydroxyphenyl)-benzimidazole; 2-phenylbenzimidazole; 2-(2-aminophenyl)-benzimidazole; etc.; the hydrazines e.g. disalicycloylhydrazine; 1-salicyloyl 2-(4-methoxy salicyloyl)hydrazine; 1,2-bis-(3,5-dichloro-salicyloyl)-hydrazine, etc. also such classes of compounds represented by such compounds as 1,8-dihydroxyanthraquinone; 4,5-diphenylimidazolone; 2-(o-hydroxyphenyl) benzoxazole (U.S. Pat. No. 2,985,661); N,N''-Bis-(salicylideneamino) oxamidene (U.S. Pat. No. 3,149,092); p-methoxy-phenyl hydrazone; 1-cyanoformimidic acid; alpha-methyl-o-hydroxy-benzylidenehydrazide (U.S. Pat. No. 3,149,092); 6-hydroxynicotinic acid; salicylaldehyde semi-carbazone; 2-aminobiphenyl; 2-phenylbenzoxazole (U.S. Pat. No. 2,985,661); bis[ 8-hydroxyquinolino]Zn II, and the like.

We may also utilize, although less preferably and as dispersions only, various inorganic fluorescent materials such as tungstate cyanide, platino cyanide and those having the formula (AB) (M) (Y)         (I)

wherein A is a metal such as calcium, barium, strontium, magnesium, beryllium, sodium, rubidium and zinc, B is a sulfide, a selenide, an oxide or a carbonate, M is a metal such as iron, cobalt, nickel, copper, zinc, manganese, silver, tin, antimony, tantalum, lead, bismuth or uranium and Y is a flux such as $Na_2SO_4$, $Na_2B_4O_7$ or NaCl.

All of these materials are well known in the art as are methods for their preparation.

The resinous material can consist of any material, or mixtures of materials, which possesses the properties mentioned above, in amounts ranging from about 5 to 60%, preferably about 10 to 50%, by weight, based on the total weight of the final composition.

Examples of suitable resinous materials include a series of materials manufactured under the name Picolastic by the Pennsylvania Industrial Chemical Corporation. These products are a series of resins produced from mixtures of styrene and styrene homologues, such as those obtained from the fractionation of the "crude solvent" from light oils scrubbed out of coke-oven or gas-house gas. They are soft, plasticizing resins with a m.p. from 5°–75°C, are low in molecular weight and are highly compatible with organic compounds.

We may also use a series of polyurethane resins available from the Spencer Kellogg Div. of Textron Inc. and sold under the name Spenkel. These resins are widely compataible with solvents and are chemical and oil resistant. They are sold as solids in xylol and have a specific gravity of 0.950 – 0.970.

A further group of useful resins are those sold by the American Cyanamid Co. under the name Rezyl. These are alkyd resins and more specifically are a series of drying oil modified or fatty acid modified alkyds produced from a saturated polycarboxylic acid and a saturated polyhydric alcohol such as the reaction products of phthalic anhydride, oxalic acid, isophthalic acid, succinic acid or adipic acid with glycerol, pentaerythritol or trimethylol ethane, etc. modified with castor oil, soya bean oil, etc.

A fourth series of useful resins are the Amberol resins which are manufactured by the Rohn and Haas Co. and comprise a group of solvent-soluble, rosin modified and unmodified phenol-formaldehyde and maleic anhydride resins.

We may also utilize the Lucite resins manufactured by E. I. du Pont de Nemours and Co. which are a series of polymeric esters of methacrylic acid of the formula

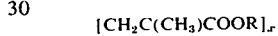

wherein R is an alkyl group of from 1 – 4 carbon atoms. They are water-white, transparent, solvent-soluble resins.

Among other useful resins are the alkylated melamine/formaldehyde resins.

It is also preferred, although not critical, that the compositions used in water applications contain a surface-active agent to promote the spreading of the composition on the surface thereof. The amount of surface-action agent should be substantially equal to the amount of fluorescent material used. Examples include sodium dioctyl sulfosuccinate; alkylphenol polyglycol ether; alkyl dimethyl benzylammonium halide; fatty acid diethanolamine condensates; sodium lauryl sulfate and the like.

A further limitation on our novel compositions is that they should have a viscosity of from about 5 to about 200 seconds in a No. 4 Ford Cup. Viscosities in this range enable one to use the compositions for the applications mentioned above.

The compositions of the instant inventions are prepared by merely mixing the ingredients together in the appropriate amounts. No critical mixing features are necessary. If a dispersion is used, the ingredients must merely be suspended before application.

As mentioned above, our novel compositions may be used to mark many objects including humans, equipment such as trucks, boats, guns, ammunition, etc. clothing, trees, shrubs and bushes, etc. They may also be used as a detecting mechanism whereby one can readily determine an area previously covered or patrolled, etc. such as daily aerial insecticide spraying.

Our novel compositions may be detected after application by merely contacting the object in question with ultraviolet light and examining contacted area in the dark with the human eye.

The following examples are set forth for purposes of illustration only and are not to be construed as limitations on the instant invention except as set forth in the appended claims. All parts and percentages are by weight unless otherwise specified.

EXAMPLE I

To a suitable vessel are added 150 parts of xylene. 2.0 Parts of sodium dioctyl sulfosuccinate are then dissolved in the xylene with slight heating. 67.0 Parts of a commercially available polyurethane resin sold as a 60% solids solution in xylol and having a specific gravity of 0.950 – 0.970 (Spenkel 77-60X — Spencer Kellogg) are then added to the vessel and stirred until dissolved. To the resultant mixture are then added 2.0 parts of 2-(2-hydroxy-5-chlorophenyl)benzothiazole. The ingredients are stirred until a clear solution is obtained.

EXAMPLE II

Following the procedure of Example I except that an equivalent amount of 2-(2-hydroxy-3,5-dichlorophenyl)-4-(3)-quinazolone is substituted for the benzothiazole, a similar composition is produced.

EXAMPLE III

Again following the procedure of Example I except that an equivalent amount of a commercially available maleic anhydride-rosin modified resin (Amberol Resin 926 — Rohm and Haas Co.) is used in place of the polyurethane, a similar composition is produced.

EXAMPLE IV

The procedure of Example I is again followed except that 67.0 parts of a commercially available phenol-formaldehyde rosin modified resin (Amberol F-7-LT— Rohm and Haas Co.) is used in place of the polyurethane resin. A similar marking composition is recovered.

EXAMPLE V

The procedure of Example I is again followed except that an equivalent amount of a commercially available polystyrene resin (Dow Resin PS-2; Dow Chem. Co.) is used in place of the polyurethane resin. A similar marking composition is recovered.

EXAMPLE VI

Utilizing an equivalent amount of a commercially available butylated melamine/formaldehyde resin (Koprez Resin 63–10; Koppers Co.) in place of the polyurethane resin of Example I, all other ingredients remaining the same, an axcellent marking composition is produced.

EXAMPLE VII

Again following the procedure of Example I except that an equivalent amount of a commercially available acrylic resin (Lucite Resin 2013; Dow Chem. Co.) is utilized in place of the polyurethane resin, a similar composition is produced.

The compositions of Examples I – VII were each placed in an individual cylindrical dispenser having removable threaded plugs in the top and bottom surfaces, each plug being provided with a small aperture in the center thereof, said apertures being temporarily sealed by means of a water-soluble film.

Each dispenser was placed in a river and held in a position about three feet below the surface thereof by means of a rope attached at one end to the dispenser and at the other end to an anchor. After about 30 seconds each composition emerged from the apertures in the top plugs at about 10 – 11 mls. per minute and spread on the water's surface.

After traversing each marked area with a boat, small streaks of fluorescent material were detectable at the waterline by examining the boats in the evening by means of a longwave (3500 angstrom) ultraviolet light source. The same makrs were still detectable several months later.

EXAMPLE IX

To a suitable vessel are added 25.0 parts of a commercially available polystyrene resin (Piccolastic A-5; Penn. Ind. Chem. Corp.) which is a soft resin mixture with a melting point of from 5°–75°C and a low molecular weight, and 75.0 parts of a commercially available aromatic hydrocarbon solvent (Panasol AN-2; Amoco Chem. Corp.) boiling above 212°F. The solution is stirred until clear and 1.0 part of 2-(2-hydroxy-3,5-dichlorophenyl)-4(3)-quinozolone is added.

The resultant composition is applied utilizing a helicopter having 8, No. 8002 Teejet flat-fan nozzles, equally spaced on a 24 foot boom. The application is made using a nozzle pressure of 40 p.s.i while flying at 60 m.p.h above a runway across which were placed, at five-foot intervals, twenty 4 × 5 in. pieces of teakwood. The results show that at a rate of application of one pint per acre, about 75% of the pieces were marked from an altitude of 500 feet.

The markings were detected by placing each piece of wood in a viewing box and illuminating it with longwave (3500 Angstroms) ultraviolet light. The markings are still detectable on the wood after a 5 week exposure in a river followed by a 3 week exposure to sunlight.

EXAMPLE X

To a suitable vessel are added 54.0 parts of a commercially available alkyd resin produced from phthalic anhydride, diethylene glycol, azelaic acid and double A castor oil, 10.8 parts of an alkyd resin produced from sebacic acid, fumaric acid, glycerol, triethylene glycol and castor oil, 43.2 parts of xylene and 1.1 parts of 2-(2-hydroxy-5-chlorophenyl)benzothiazole. The resultant mixture is stirred until clear and the composition is recovered.

EXAMPLES XI — XIII

Three additional compositions were prepared according to Example X except that the benzothiazole was replaced by equivalent amounts of 2-(o-hydroxyphenyl)benzoxazole, 4-methyl-7-dimethylamino courmarin and 4-methyl-7-diethylamino courmarin, respectively. In each instance, excellent marking compositions were recovered.

The compositions of Examples X – XIII were then sprayed on foliage using a back pack sprayer powered by a small gasoline engine. The marked area was then traversed by a person wearing a typical uniform made from black cotton fabric. Subsequent examination of the clothing in the dark and detection of the markings was made by shining a longwave ultraviolet light, which emits at 3500 Angstroms, on the material. The marking werer still observable 2 – 3 weeks later.

We claim:

1. A slightly wood permeable, covert composition of matter for the marking and identification of wooden water craft comprising (A) an aliphatic or aromatic hydrocarbon solvent, (B) from about 0.1% to about 5.0%, by weight, based on the total weight of said composition, of a hydroxyphenyl benzothiazole, (C) from about 5% to about 60%, by weight, based on the total weight of said composition, of a water-insoluble, odorless, tacky, amorphous polyurethane resin having a density less than about 1.0 and being substantially colorless when spread as a film on the surface of water and (D) from about 0.1% to about 5.0%, by weight, based on the total weight of said composition, of sodium dioctyl sulfosuccinate, said composition having a viscosity of from about 5 to about 2000 seconds in a No. 4 Ford Cup.

2. A composition according to claim 1 wherein (A) is a solvent having a boiling point of at least about 212°F.

3. A method of marking objects for subsequent identification thereof which comprises contacting said object with the composition of claim 1.

4. A method of marking objects for subsequent identification thereof which comprises contacting said object with the composition of claim 2.

* * * * *